June 19, 1962
L. A. BOTKIN
3,039,489
VALVE STRUCTURE
Filed July 1, 1959
2 Sheets-Sheet 1
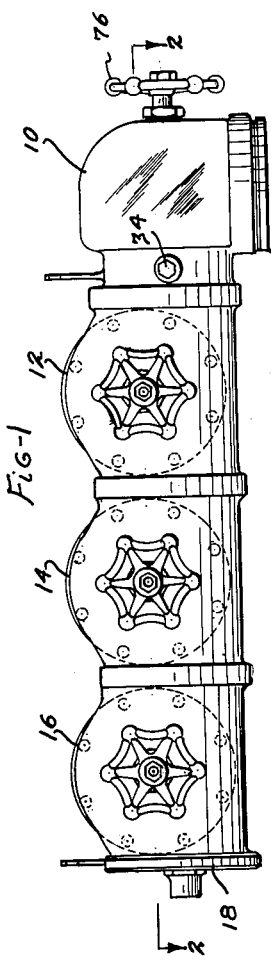
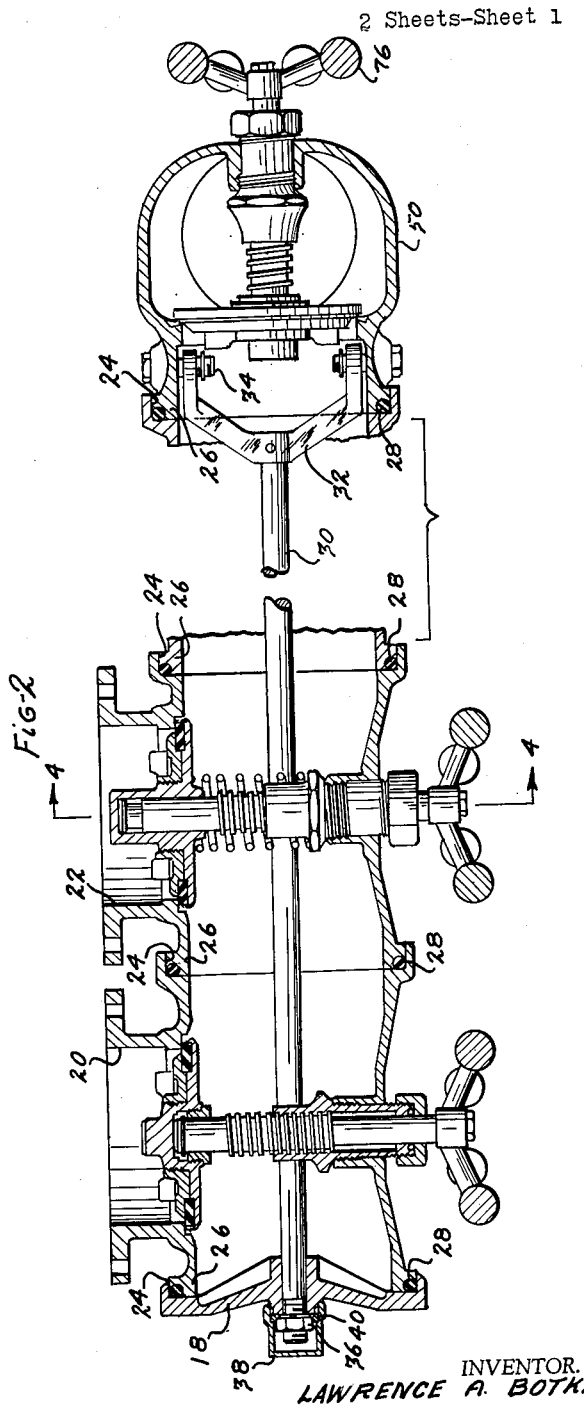
INVENTOR.
LAWRENCE A. BOTKIN
BY Toulmin & Toulmin
ATTORNEYS June 19, 1962 L. A. BOTKIN 3,039,489
VALVE STRUCTURE Filed July 1, 1959 2 Sheets-Sheet 2

INVENTOR.
LAWRENCE A. BOTKIN
BY *Toulmin & Toulmin*
ATTORNEYS

United States Patent Office 3,039,489
Patented June 19, 1962

3,039,489
VALVE STRUCTURE
Lawrence A. Botkin, Dayton, Ohio, assignor to Buckeye Iron & Brass Works, Dayton, Ohio, a corporation of Ohio
Filed July 1, 1959, Ser. No. 824,275
1 Claim. (Cl. 137—608)

This invention relates to valves and is particularly concerned with a novel valve structure having advantages in connection with the manufacture of the valves and with the mounting of the valve in combination.

Most valve structures embody a valve casing or body having a seat therein and a valve member within the body adapted for cooperation with the seat to control the fluid flow through the valve. In most cases the valve body is made of separable parts in order to permit access to the valve seat for machining, or for inserting a valve seat member into the valve and, also, it is customary for the valve member to be inserted through an opening provided in the valve body which is subsequently closed by a closure member either bolted to the valve body or threaded thereon. The forming of a valve body in multiple parts in the manner described is an expensive procedure and can even lead to certain physical weaknesses in the valve body which detracts from utility.

A primary object of the present invention is the provision of a novel tpye valve structure which is more inexpensive to manufacture than heretofore.

A still further object of the present invention is the provision of a valve structure in which the valve body is substantially a unitary member rather than being made up of separable parts as has heretofore generally been the practice in the valve art.

It is also an object of this invention to provide a valve body structure which is adapted for being utilized in the construction of substantially any conventional type valve, such as a swing check, a spring loaded check, a shut off valve or the like.

A particular object of this invention is the provisional of a valve structure characterized in that the valve member which is to cooperate with the valve seat does not require a separate access opening to permit the valve member to be inserted into the valve body or removed therefrom.

Many times valves and fittings of various types are to be manifolded together in order to provide a conveniently located group of valves for controlling connections to and from various tanks or the like. Heretofore, such valves and fittings have ordinarily been threaded together or are provided with flanges so that they can be bolted together and in both cases the structures are relatively expensive and, at least in connection with the threaded valves, the connecting together thereof and to the tanks or the like with which they communicate is rather difficult. In the case of the flanged valves and fittings, the manifolded assembly will tend to be quite bulky and to require considerable time to assemble or disassemble.

Accordingly, a still further object of the present invention is the provision of a structure suitable for valves and fittings especially adapted for manifolding so that a plurality of valves and fittings constructed according to this invention can be arranged in a group quickly and conveniently and the group will form a compact unit.

Still another object of this invention is the provision of a valve structure of a greatly simplified design in which the valve member can be inserted into the valve body through one of the regular openings therein and so the valve bodies can be manifolded into a compact unitary assembly.

The several foregoing objects as well as still other objects and advantages of the present invention will become more apparent upon reference to the following specification taken in connection with the accompanying drawings in which:

FIGURE 1 is a view showing several valves constructed according to this invention manifolded together;

FIGURE 2 is a longitudinal sectional view indicated by line 2—2 on FIGURE 1 showing the manifolded valves in section;

Figure 4:
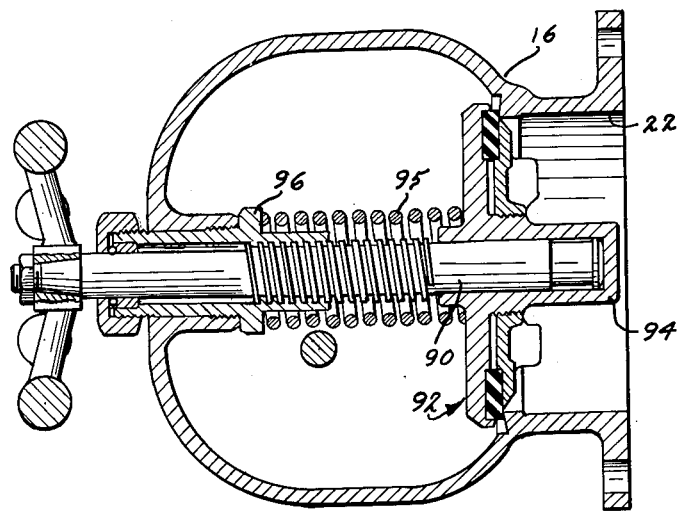
FIGURE 4 is a sectional view indicated by line 4—4 on FIGURE 2 showing one of the valves drawn at enlarged scale.

Referring to the drawings somewhat more in detail the manifolded valves in FIGURES 1 and 2 may comprise an angle valve 10 at one end through which through fluid may flow to the other valves 12, 14, and 16 which are manifolded together according to this invention.

Valve 16 opposite its abutment with valve 14 is closed by a blind flange 18 and the outlets from the several valves, of which outlets, 20 and 22, are illustrated in FIGURE 2, communicate with various tanks or conduits or the like. The particular valves illustrated in the manifolded combination are merely representative of the several types of valves but could be constructed according to this invention and it will be understood that these illustrations are not intended to limit the purview of the present invention.

According to the present invention each valve body has on one end a cylindrical recess portion 24 adapted for relatively closely receiving a cylindrical projection 26 formed on the other end of the adjacent valve. The projection 26 is formed with an annular notch or groove in which an O ring 28 of a rubber like material is placed so that when the valve bodies abut together as illustrated in FIGURE 2, this O ring will be compressed and form a seal between the valve bodies.

According to this invention a novel arrangement is provided for manifolding the valves together in the form of a tie rod 30 extending through the bodies offset from the stems in the valve bodies that control the valve members. Tie rod 30 is attached to a yoke 32 which is pivotally supported on the pivot studs 34, located in the body of valve 10 and at its end opposite yoke 32 the tie rod extends through the blind flange 18 and has attached thereto a nut 36 that can be utilized for placing the valve bodies under compression and thus in sealing engagement with each other. A cap 38 covers nut 36 and is threaded to the blind flange and is preferably sealed thereto as by O ring 40.

The described arrangement provides for the ready manifolding of as many or as few of the valves as may be desired and it will be evident that the assembly is compact and that there are no projecting bulky flanges or bolts and no threaded connections between the valves. The valves are thus very readily aligned with the conduits or tank connections to which they are to be attached and they can readily be installed or removed as desired.

Figure 3:
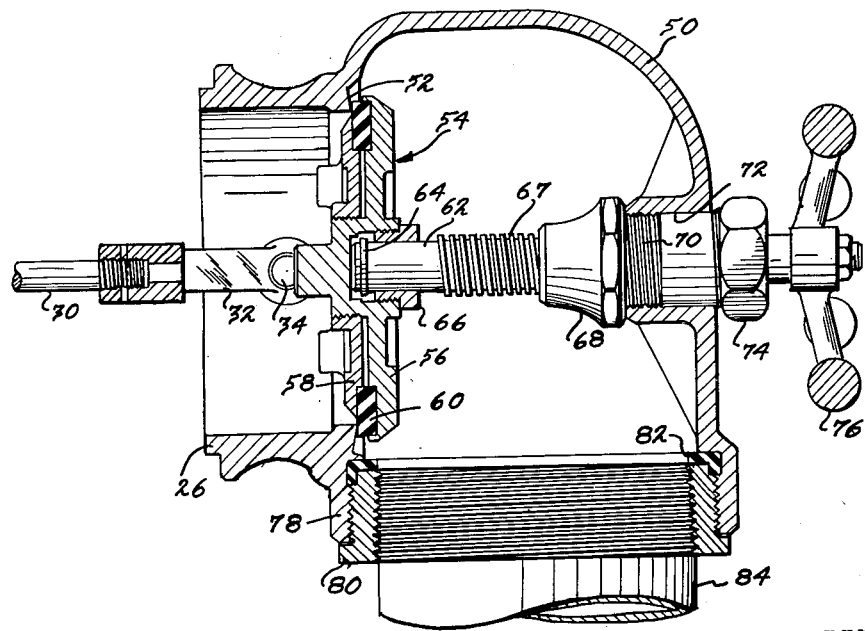
FIGURE 3 is a sectional view drawn at enlarged scale showing a modified form of valve according to the present invention.

Typical valve structures according to this invention are illustrated at somewhat enlarged scale in FIGURES 3 and 4. FIGURE 3 is a valve consisting of a body portion 50 constructed according to this invention and which is characterized by having a valve seat 52 formed therein adapted for being engaged by a valve member generally indicated 54 and which comprises a metal disc 56 to which is threaded a slightly smaller metal disc 58 with there being retained between the discs the ring 60 which is adapted for engagement with the valve seat 52. It will be noted that disc 56 is annularly recessed for receiving ring 60 so that the ring is backed up by the disc thus permitting considerable pressure to be developed on the valve seat when necessary.

The valve member according to this invention is adapted for being utilized in a number of different ways for engaging the valve seat. For example, the valve member could be arranged on an arm so as to swing according to practices well known in the swing check art. Also, the valve member could be attached to a valve stem as indicated in FIGURE 3 where valve stem 62 has a snap ring 64 on its lower end and with there being a nut or the like 66 threaded into disc 56 so as to retain the stem and the valve member interconnected while permitting a certain freedom of floating movement of the valve member on the stem.

In FIGURE 3 valve the stem 62 is threaded as at 66 and this threaded portion of the stem threadedly engages the threaded sleeve 68 which, in turn, is threaded at 70 into a bore 72 formed in the valve body.

The stem extends through the sleeve and there is packing and a packing gland 74 on the outer end of the sleeve sealingly engaging the stem and preventing leakage from the valve body. It will also be evident that the bore 72 and the sleeve 68 could be sealed together as by an O ring disposed in the valve body about the unthreaded portion of the sleeve if so desired.

A knob or hand wheel 76 on the outer end of the stem completes the valve structure.

A particularly important feature according to the present invention is that at least one of the valve ports, in this case the port 78, is formed of such size that the valve member can be inserted into the valve body therethrough thus eliminating the usual bonnets and the like that are provided on valve bodies for this purpose. In the FIGURE 3 modification the port 78 may be threaded and may also receive a bushing 80 which is sealed into the valve body as by the seal member 82. The bushing 80 permits the valve body to be connected to a conduit 84. It will also be evident that the conduit could be the same size as the threaded opening in the valve body thereby eliminating the need for the bushing.

In FIGURE 4 there is shown a somewhat modified type of valve wherein the valve stem 90, and which is constructed the same as the valve stem 66 of FIGURE 3, is not attached to the valve member 92 so as to move it positively in both directions. Rather, the valve stem is operable for forcing the valve member down against its seat by virtue of bottoming in the bore in the projection of 94 formed on the upper disc portion of the valve member without moving it. The valve member 92 in FIGURE 4, instead, is urged toward the valve seat by a compression spring 94 bearing between the valve member and the underside of the sleeve 96 which is somewhat modified from the corresponding sleeve 68 of FIGURE 3 in order to provide a bearing for the spring. The valve of FIGURE 4 is thus by way of being a spring loaded check valve adapted for being locked closed or for being restricted in its degree of opening by adjustment of the stem 90.

It will be understood that the particular valves illustrated are only exemplary of many types of valves which can be manufactured according to the present invention while retaining the conventional functions of such valves.

The valves constructed according to the present invention, utilizing the unique tongue and groove fitting between the individual valve bodies and with the entire assembly being held together by single tension bolt, imparts flexibility to the application of the valves and the fittings involved without in any way detracting from their hydraulic characteristics or efficiency. The valves and fittings can be of greatly reduced weight without sacrificing any strength and can be constructed at small expense as compared to valves or fittings constructed according to the prior art.

It will be understood that this invention is susceptible to modification in order to adapt it to different usages and conditions; and, accordingly, it is desired to comprehend such modifications within this invention as may fall within the scope of the appended claim.

I claim:

In combination; a plurality of hollow valve bodies in aligned abutting relation and opening into a common manifold chamber, an angle valve spaced from said plurality of valves and communicating with said manifold chamber for controlling fluid through said manifold, each of said valve bodies having port means communicating with corresponding port means in the next adjacent body or bodies, one of each of said communicating port means being surrounded by a shouldered cylindrical recess or groove, the other of said port means being surrounded by a cylindrical projection or tongue fitting into said recess or groove, a notch about the end of said projection or tongue, a rubber-like seal ring in the notch compressed between the bodies in sealing relation therewith, a single tie rod extending through said bodies offset slightly from the centers thereof, a yoke pivotally supported in one end body to which yoke the rod is attached, a blind flange on the outer end wall of said manifold chamber through which said tie rod extends, and a nut threaded onto the outer end of said tie rod and securing the same to said manifold chamber, said nut being adjustable for placing said valve bodies under compression and in sealing engagement with each other, a sealing means being disposed between said tie rod and nut and the blind flange, and between the blind flange and said manifold end wall.

References Cited in the file of this patent

UNITED STATES PATENTS

| | | |
|---|---|---|
| 664,368 | Grosse | Dec. 18, 1900 |
| 1,540,529 | Blaisdell | June 2, 1925 |
| 1,692,154 | Broido | Nov. 20, 1928 |
| 2,105,241 | Gazey | Jan. 11, 1938 |
| 2,747,611 | Hewitt | May 29, 1956 |

FOREIGN PATENTS

| | | |
|---|---|---|
| 7,048 | Netherlands | June 15, 1922 |
| 976,854 | France | Nov. 1, 1950 |